March 27, 1934.  R. G. BROCKWAY ET AL  1,952,309
TOP CONSTRUCTION FOR VEHICLE BODIES
Filed July 11, 1932   2 Sheets-Sheet 2
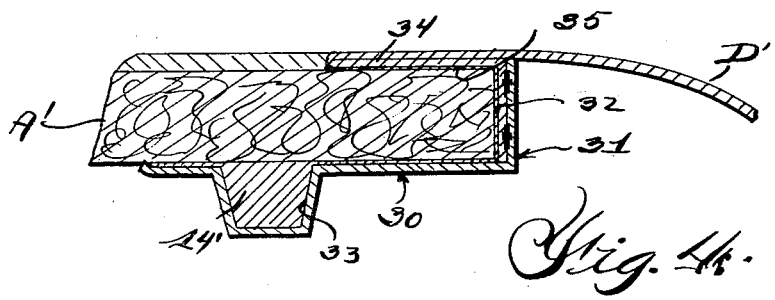
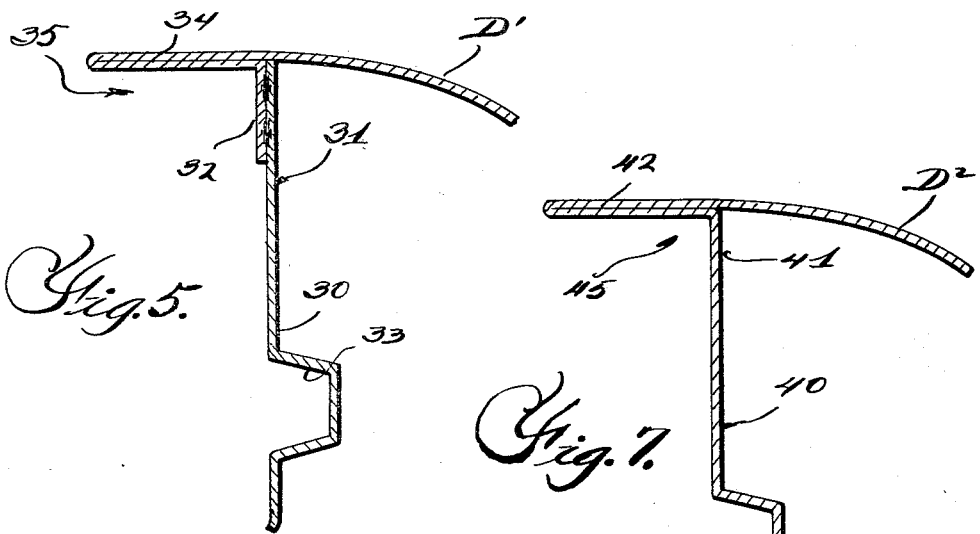
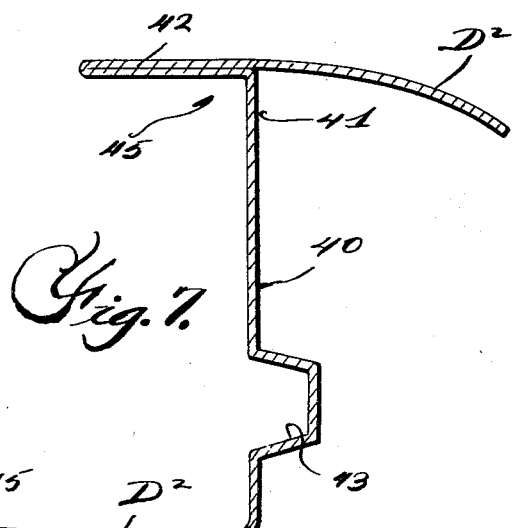
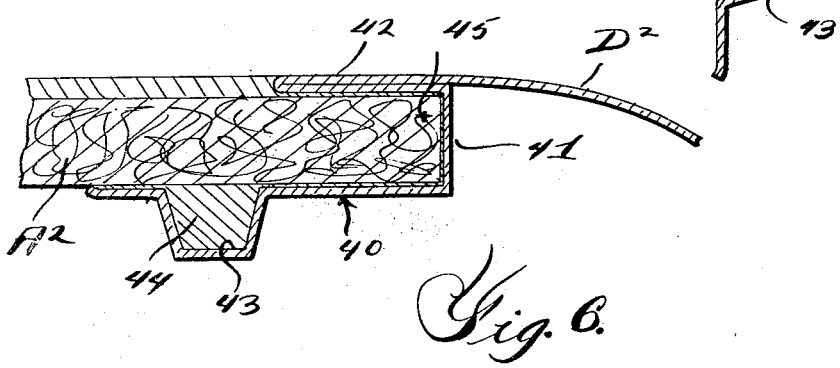
Inventors
Rae G. Brockway
Alfred J. Smith
By Whittemore Hulbert Whittemore & Belknap
Attorneys Patented Mar. 27, 1934

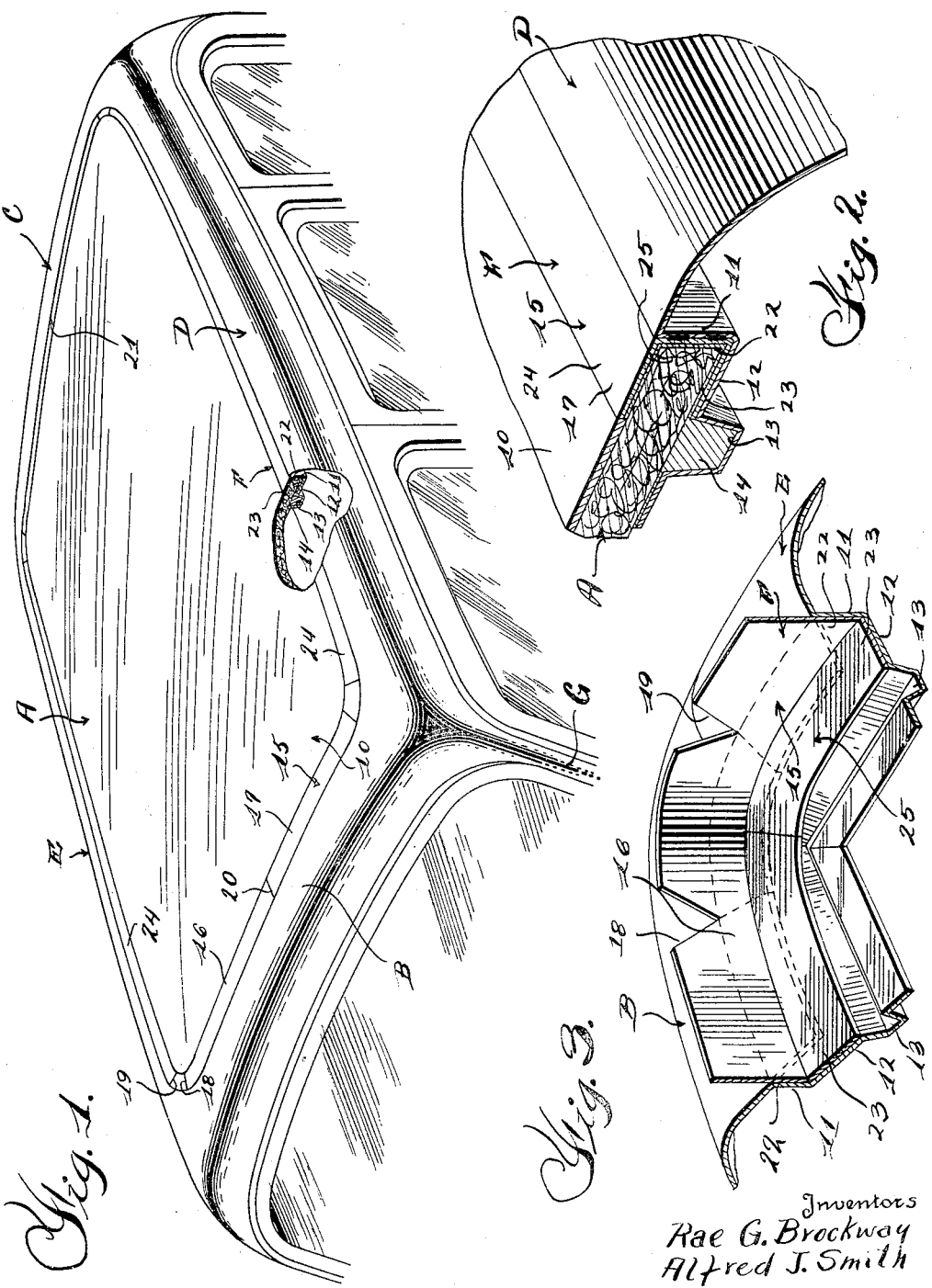

1,952,309

UNITED STATES PATENT OFFICE 1,952,309

TOP CONSTRUCTION FOR VEHICLE BODIES

Rae G. Brockway, Grosse Pointe Village, and Alfred J. Smith, Detroit, Mich., assignors to St. Clair Rubber Company, Detroit, Mich., a corporation of Michigan Application July 11, 1932, Serial No. 621,964

1 Claim. (Cl. 296—137)

This invention relates generally to roof or top constructions and refers more particularly to those designed for vehicle bodies of the closed type.

One of the essential objects of the invention is to provide a top of this type wherein the deck thereof is preferably formed of light material and is received between suitable front, rear and side quarters or panels.

Another object is to provide a top wherein the deck is secured and held in place by reinforcing and stiffening means for the quarters or panels aforesaid.

A further object is to provide a top wherein the construction is such that the usual ribs or cross bows may be dispensed with entirely.

A further object is to provide a top wherein the construction is such that the deck may be bodily inserted into assembled relation with the quarters or panels.

A further object is to provide a top wherein the connections between the deck and quarters are such that separate fastening devices such as nails, screws, bolts, etc., are unnecessary and have been dispensed with entirely.

A further object is to provide a top wherein sealing compound is associated with the deck and its holding means so that all joints will be absolutely water-tight.

A further object is to provide a top wherein the construction and arrangement of the parts are such that an extremely neat and attractive appearance is produced.

Other objects, advantages and novel details of construction will be made more apparent as this description proceeds, especially when considered in connection with the accompanying drawings, wherein:

Figure 1 is a perspective view partly in section showing a top construction embodying our invention;

Figure 2 is a sectional perspective view of a portion of Figure 1;

Figure 3 is a fragmentary perspective view but showing the relation of the parts prior to the insertion of the deck;

Figure 4 is a fragmentary sectional view through a slightly modified construction;

Figure 5 is a view similar to Figure 4 but showing the relation of the parts prior to the insertion of the deck;

Figure 6 is a fragmentary sectional view through another modification;

Figure 7 is a view similar to Figure 6 but showing the relation of the parts prior to the insertion of the deck.

Referring now to the drawings, A is the deck; B, C, D and E respectively are the front, rear and side quarters or panels, and F is the deck holding means of a vehicle top or roof embodying our invention. As shown, the deck A is a single sheet of light material such as Insul-dek, Celotex and the like, and may if desired be provided with a top coating or dressing 10 of some suitable material such as vulcanized fiber. The quarters B, C, D and E respectively are preferably formed of sheet metal and are rigidly secured together and to the supporting vehicle body structure G. Preferably these quarters are coved and are provided at their inner longitudinal edges with downwardly extending flanges 11 and inwardly extending flanges 12. The downwardly extending flanges 11 are substantially equal in depth to the thickness of the deck A, while the inwardly extending flanges 12 constitute seats for the deck and are provided longitudinally thereof with upwardly opening channels 13 that serve to stiffen and reinforce the structure and also to form wells for the reception of a suitable sealing compound such as 14. The deck holding means F preferably comprises a frame 15 secured to the quarters or panels B, C, D and E respectively. Preferably this frame comprises two sections 16 and 17 respectively notched at the corners 18 and 19 and secured together at the front and rear at points 20 and 21 substantially in line with the longitudinal median line of the roof. As shown, the sections 16 and 17 comprise bars or rails that are substantially U-shaped in cross section and straddle the edges of the deck A. The bases 22 of the sections 16 and 17 are rigidly secured, preferably by a welding operation, to the downwardly extending flanges 11 of the quarters, while the lower sides 23 of said sections are secured to the inwardly extending flanges 12 of the quarters. The upper sides 24 of the sections 16 and 17 are substantially in line or flush with the quarters B, C, D and E respectively and bear firmly against the upper sides of the deck A. Thus with this construction the upper sides 24 of the sections are initially in a substantially upright position, as illustrated in Figure 3, to enable the deck to be bodily inserted from above into the opening 25 formed by the quarters B, C, D and E. Sealing compound such as 14 is then placed about the edges of the deck within the sections 16 and 17 whereupon the upper sides 24 are bent downwardly upon the upper side of the deck to hold the latter in place upon the inwardly extending flanges 12 of the quarters.

In Figures 4 and 5 we have illustrated a slight modification wherein the deck A' corresponding to the deck A in Figure 2 is bodily inserted from below and is held by inwardly extending flanges 30 of sections 31 secured to depending flanges 32 of the quarters or panels such as D'. As shown, the flanges 30 correspond to the flanges 12 and are provided with upwardly opening longitudinally extending channel portions 33 for the reception of the sealing compound 14'. The sections 31 are secured, preferably by a welding operation, to the depending flanges 32 of the quarters and the latter preferably have closed return bent portions 34 projecting over and cooperating with the flanges 30 of the sections to hold the deck A'. Thus in this instance the flanges 30 initially extend downwardly as illustrated in Figure 5 so that the deck A' may be inserted from below into the opening 35 formed by the quarters. Sealing compound such as 14' is then placed about the edges of the deck and the flanges 30 are then pressed upwardly against the lower face of the deck A', as illustrated in Figure 4 to hold the deck against the overlapping return bent portions 34.

In Figures 6 and 7 we have illustrated another modification wherein flanges 40 of the quarters such as $D^2$ are integral with depending flanges 41 of the quarters and cooperate with overlapping closely return bent portions 42 of the quarters to hold the deck $A^2$. The flanges 40 have upwardly opening channel portions 43 which correspond to the channel portions 13 and 33 and are adapted to receive the sealing compound 44 placed about the edges of the deck $A^2$ when it is inserted from below in the opening 45 formed by the quarters. Initially the flanges 40 extend downwardly as illustrated in Figure 7 so that the deck $A^2$ may be bodily inserted from below into the opening, whereupon the said flanges may be bent upwardly against the lower face of the deck as illustrated in Figure 7.

What we claim as our invention is:

A vehicle top construction comprising a non-metallic deck, a support for said deck including a sheet of metal having a return bent portion extending over and substantially parallel to the upper face of the deck and having a depending flange close and substantially parallel to an edge of said deck, means projecting from said flange beneath said deck in substantially parallel relation to and cooperating with the return bent portion aforesaid to hold the panel, and means operable by the last mentioned means for holding a sealing compound against the lower face of said deck.

RAE G. BROCKWAY.
ALFRED J. SMITH.